United States Patent
Ji et al.

(10) Patent No.: US 7,971,254 B1
(45) Date of Patent: Jun. 28, 2011

(54) METHOD AND SYSTEM FOR LOW-LATENCY DETECTION OF VIRUSES TRANSMITTED OVER A NETWORK

(75) Inventors: Shuang Ji, Santa Clara, CA (US); Yong Pan, Nanjing (CN); Renkui Tao, Nanjing (CN); Hong-Wu David Lu, Cupertino, CA (US)

(73) Assignee: Netgear, Inc., San Jose, CA (US)

( * ) Notice: Subject to any disclaimer, the term of this patent is extended or adjusted under 35 U.S.C. 154(b) by 1094 days.

(21) Appl. No.: 10/925,716

(22) Filed: Aug. 24, 2004

Related U.S. Application Data

(60) Provisional application No. 60/539,923, filed on Jan. 28, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/24; 380/4; 703/28; 709/200; 709/203; 709/217; 709/221; 709/222; 709/223; 709/219; 709/224; 709/246; 713/22; 713/23; 713/26; 713/187; 713/188; 713/189; 713/200; 713/201; 726/14; 726/22; 726/23; 726/25; 726/27; 726/28; 726/29; 726/30

(58) Field of Classification Search .................. 726/24
See application file for complete search history.

(56) References Cited

U.S. PATENT DOCUMENTS

| | | | | |
|---|---|---|---|---|
| 6,067,410 A | * | 5/2000 | Nachenberg | 703/28 |
| 6,088,803 A | * | 7/2000 | Tso et al. | 726/22 |
| 7,203,960 B1 | * | 4/2007 | Painter | 726/22 |
| 7,246,227 B2 | * | 7/2007 | Kissel | 1/1 |
| 7,376,842 B1 | * | 5/2008 | Hursey | 713/188 |
| 2002/0095598 A1 | * | 7/2002 | Camble et al. | 713/200 |
| 2002/0166085 A1 | * | 11/2002 | Peikari | 714/38 |
| 2003/0033536 A1 | * | 2/2003 | Pak et al. | 713/188 |
| 2003/0088792 A1 | * | 5/2003 | Card et al. | 713/201 |
| 2004/0054498 A1 | * | 3/2004 | Shipp | 702/182 |
| 2005/0216770 A1 | * | 9/2005 | Rowett et al. | 713/201 |

\* cited by examiner

*Primary Examiner* — William Korzuch
*Assistant Examiner* — Bryan Wright
(74) *Attorney, Agent, or Firm* — Fenwick & West LLP

(57) ABSTRACT

This invention relates generally to systems and methods for rapid, low-latency detection of viruses in network transmissions and specifically to methods for determining which parts of a network transmission might contain viruses and checking and cleaning only those parts of the transmission which could potentially be infected as soon as sufficient information is available for such a check.

24 Claims, 7 Drawing Sheets

Zip File Format

METHOD AND SYSTEM FOR LOW-LATENCY DETECTION OF VIRUSES TRANSMITTED OVER A NETWORK

CROSS-REFERENCE TO RELATED APPLICATIONS

The present application claims priority under 35 U.S.C. §119(e) to U.S. Provisional patent application entitled "Fast Algorithm for Computer Virus Scanning in Data Streams" filed on Jan. 28, 2004, having Ser. No. 60/539,923, which is incorporated by reference in its entirety.

BACKGROUND OF THE INVENTION

1. Field of the Invention

This invention relates generally to hardware and methods for rapid, low-latency detection of viruses in network transmissions and specifically to methods for determining which parts of a network transmission might contain viruses and checking and cleaning only those parts of the transmission which could potentially be infected as soon as sufficient information is available for such a check. In particular, the present invention is directed to a system and method in which scanned data will be output as soon as possible as well to complete both the input and output aspects of streams

2. Description of the Related Art

The first generation of computer viruses appeared in the 1980's. These early viruses had little effect because they typically were spread using removable media such as floppy disks. For instance, when an infected floppy disk was inserted into a clean computer, the floppy disk would infect the machine by embedding a virus into the memory and/or storage of the machine and then the virus would copy itself to every uninfected floppy disk inserted from that time forward. Even when the machine was rebooted the machine would often remain infected because of the likelihood that the boot system disk had also become infected. Of course, computers with hard disks were permanently infected unless the virus was discovered and removed. All computers that came in contact with removable media from an infected computer and that were running the same operating system would also become carriers of that particular virus. Of course, viruses that moved from computer to computer by human hands were replicated slowly, so the effects of such floppy-transmitted viruses were limited.

In the 1990's many computers began to be connected to the Internet and people found it very convenient to use the Internet as a communication means. While the Internet improved connectivity and communication between computers, it also gave virus creators a new, fast and effective transport medium. As a result, almost all current viruses attempt to replicate themselves via a network using email, the worldwide web, and other network transfer protocols. MyDoom and SoBig are examples of such network borne viruses.

There are several companies, including McAfee, Inc. of Santa Clara, Calif., USA that provide desktop anti-virus protection. Desktop tools are tools that can search through files on hard disks connected to a computer to detect and remove viruses. The tools available from these companies work on individual computers to eliminate viruses by looking through file storage or disks one file at a time to determine if any of those files have code in them that matches the signature of a known virus or in other ways appear to be a virus. If a virus is detected, the software either deletes the file or the part of the file that contains the virus, rendering it ineffective. This strategy for finding and removing viruses is well known in the art and has been used from the days of floppy-disk borne viruses More advanced forms of finding and removing viruses exist today. Many companies install gateways or computers that sit between a company's internal network or Local Area Network (LAN) and the Internet or Wide Area Network (WAN). These gateways are also called firewalls or routers, depending on their function. Gateways provide services that protect computers on the Local Area Network from access by other computers outside the LAN. Since gateways control all Internet access (in other words, all traffic between the LAN and WAN must travel through such a gateway) a gateway is in a unique position as a computer that can check all files moving across the LAN boundary—the path that most viruses take today.

F-Secure Corporation of Helsinki, Finland provides a tool that looks through files stored on a gateway. F-Secure's product looks through each file that is received once it is stored on the hard disk of the gateway. For instance, email destined for a computer on the LAN is temporarily stored on a gateway as it is queued up for the recipient inside the network. F-Secure's product will scan such email and any attachments to determine whether or not they contain viruses. If they do, the email can be cleaned and either forwarded to the intended recipients or rejected and sent back to the senders.

Unfortunately, F-Secure's email scanning technique slows down the network. Each file requested by an internal computer or sent by an external computer must be stored locally on the gateway and then searched for viruses. When a set of compressed files, like a ZIP file is received, the entire set of files is stored and checked individually before any of the files is transmitted to the requesting host. This can cause unacceptable delays to the requesting host, including time-outs that prevent the requesting host from getting any data at all. Time delays associated with network transmission are referred to as "latency," and most computer network protocols have time-outs that limit the amount of latency they can accept. Long delays can cause a program or system to stop working because it incorrectly detects that it is no longer connected to the network.

All current virus checking or scanning software uses the file interface to the computer system to check for viruses. The file API in most current operating systems is exactly the same, allowing any program to open, read, or write to a file using a set of basic system calls. Files can be accessed randomly—allowing direct access to a specific part of the file at any time. In fact, file access even works across networks on different operating systems. An Apple PowerBook computer can access files stored on a Windows computer or Linux system because there exists file access protocols (for instance, SMB) which allow a program on one computer to freely access files on another computer without knowing that the file is being accessed over the network. Any program, including virus check programs, that are written to detect and clean files can use any files accessible to the computer without regard to the actual storage location of the bits. The easiest way to create a gateway-based virus-scanning tool is to store incoming files temporarily on the system and run the file-based virus scanner against the file.

What is needed is a method of reducing the latency of virus checking on a gateway system so that large packets of information are not unnecessarily delayed during a virus check. What is further needed is a method of checking just part of a transmission for a virus before the entire transmission is completed. What is further needed in a system for checking for viruses on a gateway, are methods of deciding which parts of a data transmission must be checked for viruses to avoid unnecessary delays in data transmission.

SUMMARY OF THE INVENTION

According to the present invention, a system and method for checking all network traffic flowing from a first network to a second network (e.g., a WAN or external network to a LAN or internal network). As network packets are received, the packets are observed in order to determine which packets constitute individual files. In addition, if those individual files can be further broken into sections that can be checked individually or rejected as potential virus containers, the present invention makes such a determination and checks only those sections of files which might contain viruses, passing sections which cannot possibly be virus containers through to the LAN unchecked.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
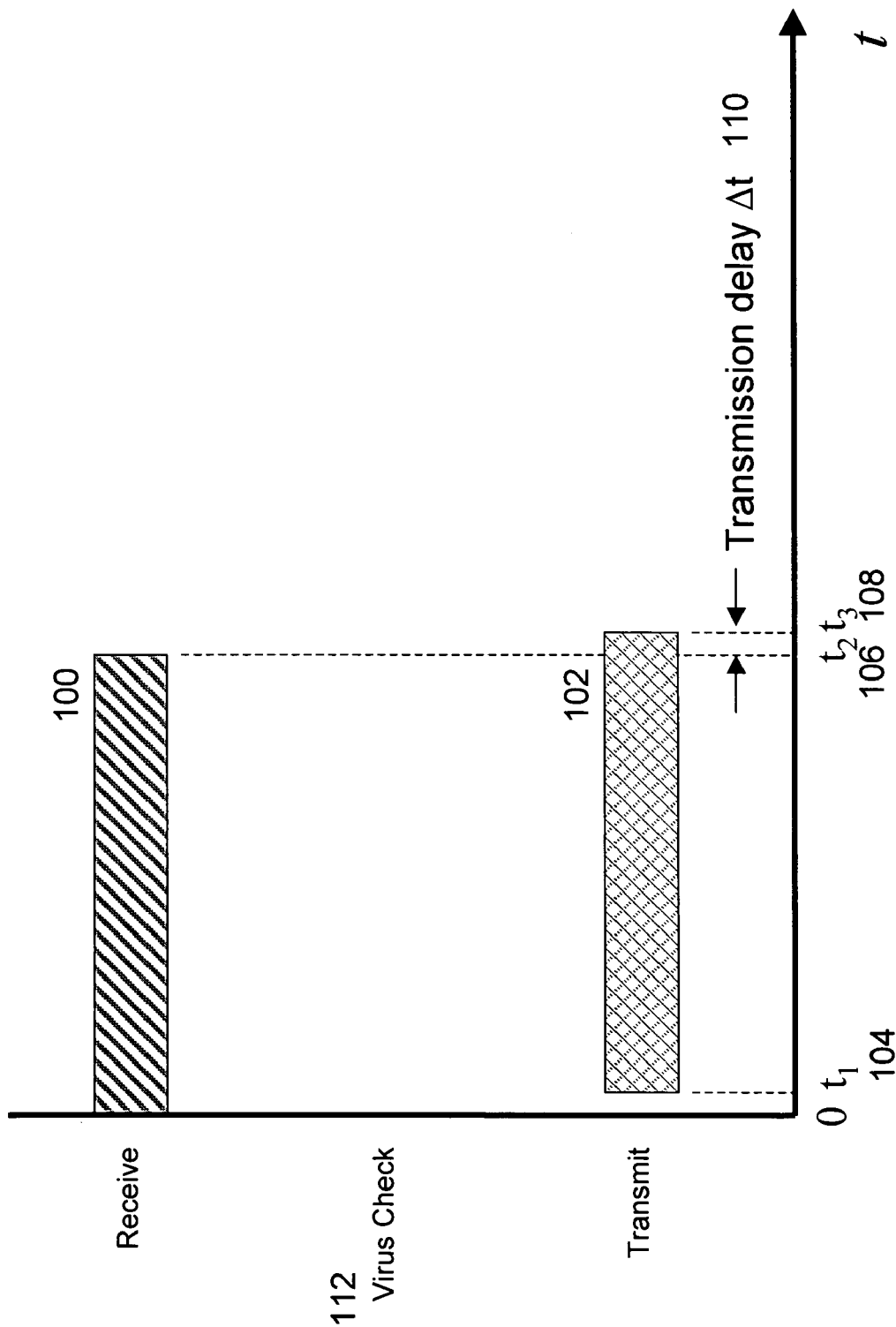
FIG. 1 is a timing diagram depicting a typical delay in network data delivery when no virus checking is performed, according to prior art.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

In this application, the following terms are used:

"LAN" refers to a local area network or internal network. A LAN can include one or more computers inside of a firewall, router or gateway. Such internal computers are often the targets of viruses.

The terms "Internet" or "WAN" will be used interchangeably in this specification and refer to an external network. External networks are typically the source of viruses. Although viruses can originate in a LAN and spread to a WAN, most companies are more concerned about viruses traveling in the other direction and gateways and firewalls typically provide no protection from internal viruses. The present invention will be described below in specific contexts, however those skilled in the art will recognize that the present invention may be used between any two networks such as two internal networks, an internal network and external network or between two external networks, and the description below is provided only by way of illustration.

"Gateway" refers to a computer or any other hardware device which resides between the external network or WAN and the internal network or LAN. The most basic gateway simply allows packets of data or information to flow freely between the LAN and WAN and back and offers no protection. A more typical gateway is a router, which determines which packets should stay on the LAN or which should be "routed" to the WAN and vice versa. Another type of gateway is called a "firewall." Firewalls also route packets, but refuse packets that are specifically not permitted, or alternatively refuse all but those that are expressly permitted. Firewalls are well understood in the art and it is not necessary to provide a more detailed description in explaining the present invention. Any machine residing between a two networks and controlling packet flow between the two networks will be referred to as a gateway when describing the present invention.

"Packet" refers to an atomic unit of data sent over the network. When a file is transmitted, it is broken up (if large enough) into individual packets that are encoded to travel over the network. Packet size and the data contained in a packet are well understood in the art and will not be described in more detail as it relates to the present invention. It is sufficient to describe packets as small chunks of data that can be reassembled at the receiving computer (or in the gateway) in order to reconstruct a transmitted file or email.

"Virus" refers to a malicious program, instructions or set of bytes or data that are designed to cause a computer to perform some set of instructions that are not requested nor desired by the owner or operator of a computer. Not all viruses cause data loss, but a virus by definition executes operations or code according to the wishes of someone who has no responsibility for the affected computer.

A "file" refers to data that may be transmitted or stored in memory or a storage device in a single unit. Files may be comprised of several other files, like a ZIP format file or TAR format file that contain many individual files, sometimes in compressed form.

"Scan" refers to the process of searching a file or part of a file for a virus or virus signature. Scanning is usually accomplished by looking through a set of bytes for a sequence of bytes known to belong to a specific type of virus. When a file or set of bytes is scanned for a virus, and if a virus signature is found, that file or set of bytes can be cleaned (the virus is removed from that file or set of bytes), or the file or set of bytes can be deleted.

"Section" refers to a small part or portion of a file, as small as a single byte, which can be scanned independently for viruses. For instance, a MIME encoded file can contain many independent sections that are referred to as attachments in email. Each section can contain an image, an executable file, and HTML format file, or anything else, including just a single byte. Each of these sections can be scanned independently for a virus and the section either cleaned or deleted as appropriate.

Referring now to FIG. 1, there is shown a timing diagram that shows the typical timing of a file being transmitted through a basic gateway. As packets are received from the WAN, they are transmitted to the LAN according to routing protocols well understood by those who are skilled in the art. The file or individual packets may have been requested by a computer inside the LAN or may have been sent by a computer on the WAN without an initial request.

In FIG. 1, no virus checking is enabled and packets are forwarded as quickly as they are received. The file is not buffered in any way, but forwarded immediately, packet by packet. The length of time taken to receive the file 100 is indicated on the time axis as $t_2$ 106. $t_1$ 104 indicates the latency or delay between the reception of the beginning of the first packet by the gateway and the beginning of transmission of the first packet by the gateway (not shown). There is always some small delay as the packet moves from the incoming network interface card (NIC) (connected to the WAN) to the outgoing NIC connected to the LAN. The minimum delay is due to the time it takes receive the entire packet and copy it from the WAN NIC to the LAN NIC after deciding where the packet should be routed.

Since each packet in this case can be copied and transmitted independently of all the other packets, the total transmission delay $\Delta T$ 110 is very close to or the same as the initial minimum delay $t_1$ 104.

Figure 2:
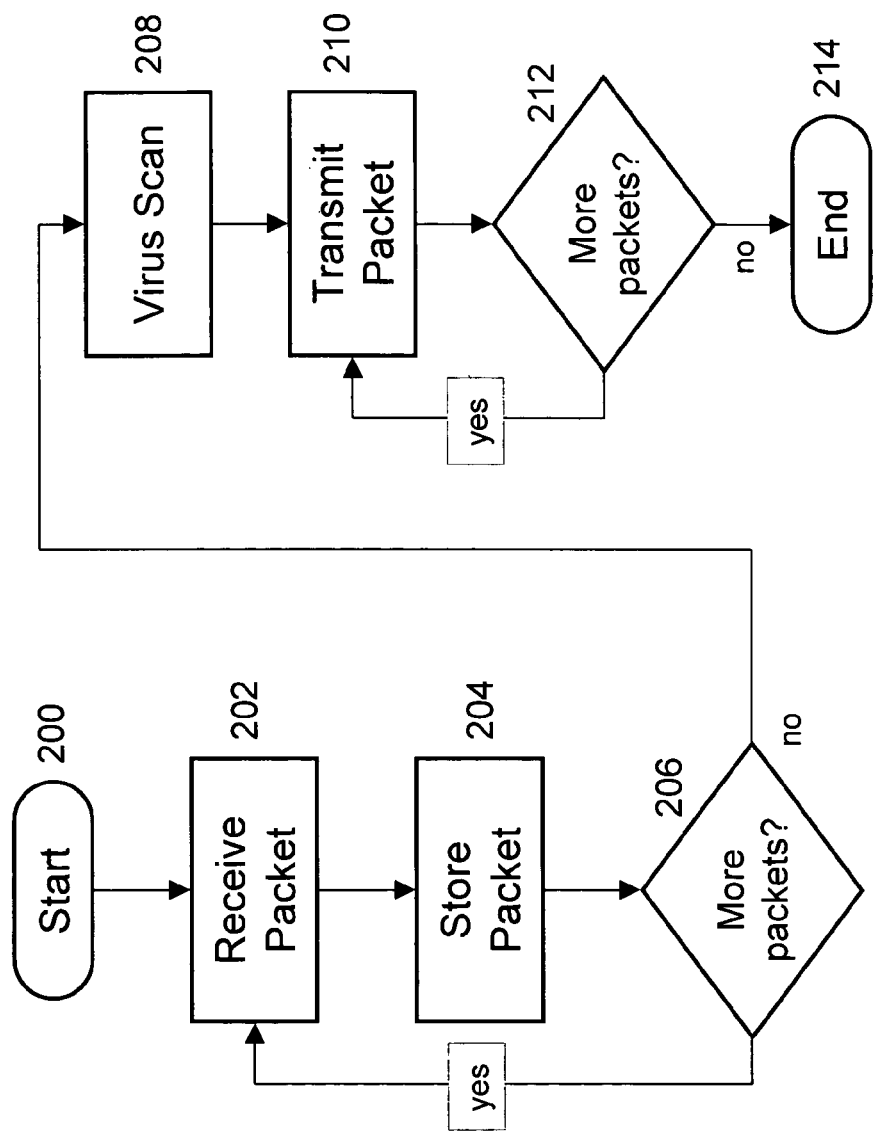
FIG. 2 is a flow chart depicting a typical control flow of a current gateway-based product, according to the prior art.

FIG. 2 is a flow diagram of the operation of the gateway when it is checking for viruses as in the prior art. As previously described, in existing systems, an entire file must be received and stored in some buffer memory on the gateway so that a virus checking or scanning algorithm can be run against the file. All current systems use file-based virus scanning and require the entire file to be stored in some storage device before scanning begins.

The communication between a computer on the WAN and the gateway is first initiated 200. Then the initial packet representing a transmission or file is received 202 at the gateway. The packet is stored 204 in memory or a storage device. The received packet is next examined 206 to determine if more packets are going to be sent. Alternatively, the incoming packet buffer on the NIC can be examined to see if another packet has been transmitted. If more packets are to be sent, the process returns to step 202 and the loop continues until the final packet for a single file or protocol transmission (like HTTP) is complete. At step 204, as each packet is received, it is decoded and stored in a way that the virus checking software can access the entire set of packets as a single file. In other words, the packets are decoded sufficiently to reconstruct the entire file before being transmitted by the computer on the WAN.

At step 208, a virus scan is performed on the file received in steps 202 to 206. If a virus is found, the file is cleaned/rewritten with the virus expunged (perhaps by writing 0's to the location of the virus in the file) or the transmission is cancelled altogether, causing the reception at the LAN computer to time out, or a warning message is somehow conveyed to the user.

If no virus is found or the virus is cleaned transmission 210 of the received packets is begun. The file is re-encoded in the correct packet format and each packet is sent from the gateway to the computer in the LAN. At 212, if more packets remain to be transmitted, control is sent back to step 210, another packet is sent, and the loop is continued until no more packets remain. At step 214, the process is complete for this transmission.

Figure 3:
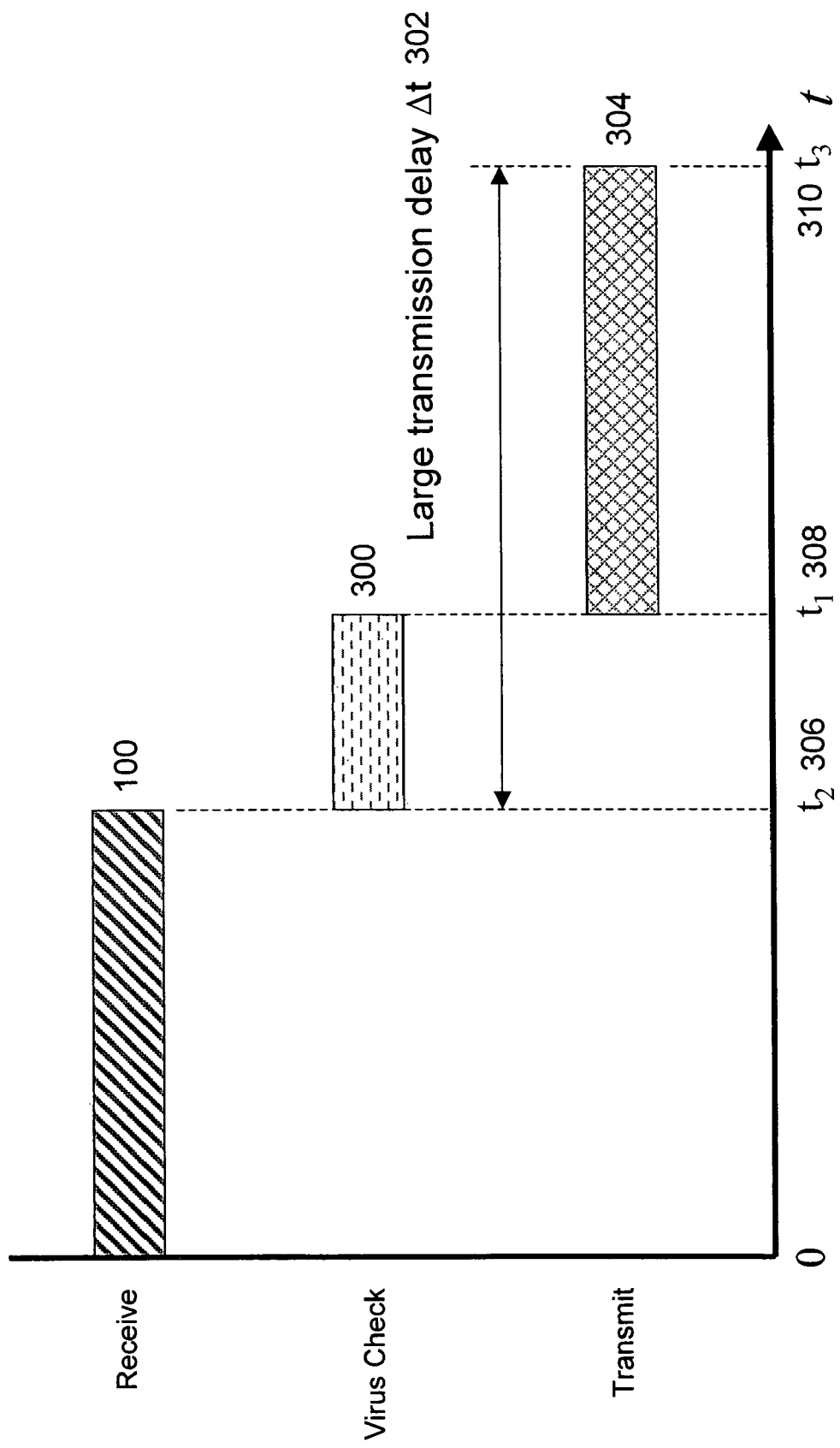
FIG. 3 is a timing diagram depicting network latencies or delays experienced by a typical system in the prior art.

It will be clear to those skilled in the art that checking for viruses on the gateway using the method of the prior art as shown in FIG. 2 introduces significant latencies to the network transmission. In FIG. 3, a timing diagram is shown that clarifies the latencies. $t_1$ 308 used to be shortly after the reception of the initial packet, but now cannot happen until after all packets in this transmission have been received 100 and the virus check 300 has occurred. The transmission delay $\Delta T$ 302 is the length of the virus check 300 plus the transmission of the entire file 304 to the computer in the LAN. $\Delta T$ 302 is guaranteed to be much longer than $\Delta T$ 110 due to the design of the virus checking method and system of the prior art gateway. With current systems, it is impossible to move $t_1$ 308 before $t_2$ 306 as it is in the low-latency timing diagram of FIG. 1.

Figure 4:
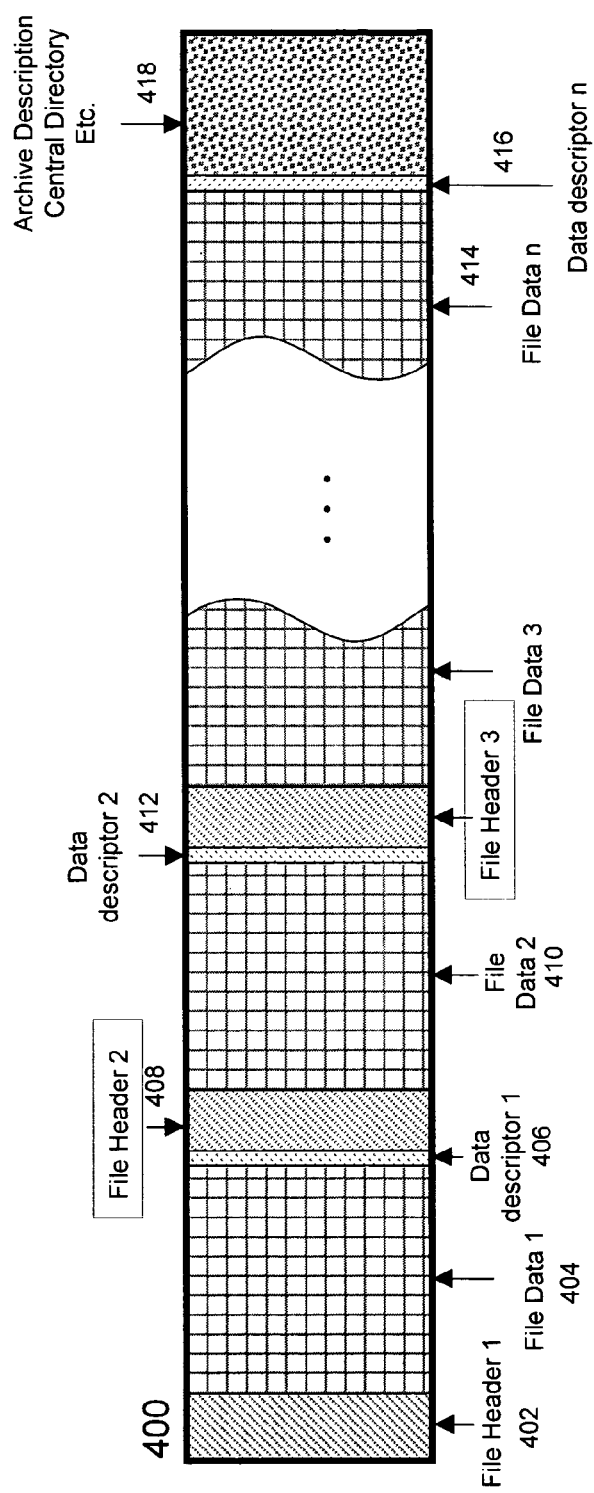
FIG. 4 is a block diagram depicting the format of a compressed file in an exemplary ZIP file format that may be transmitted over a network through a gateway.
Figure 5:
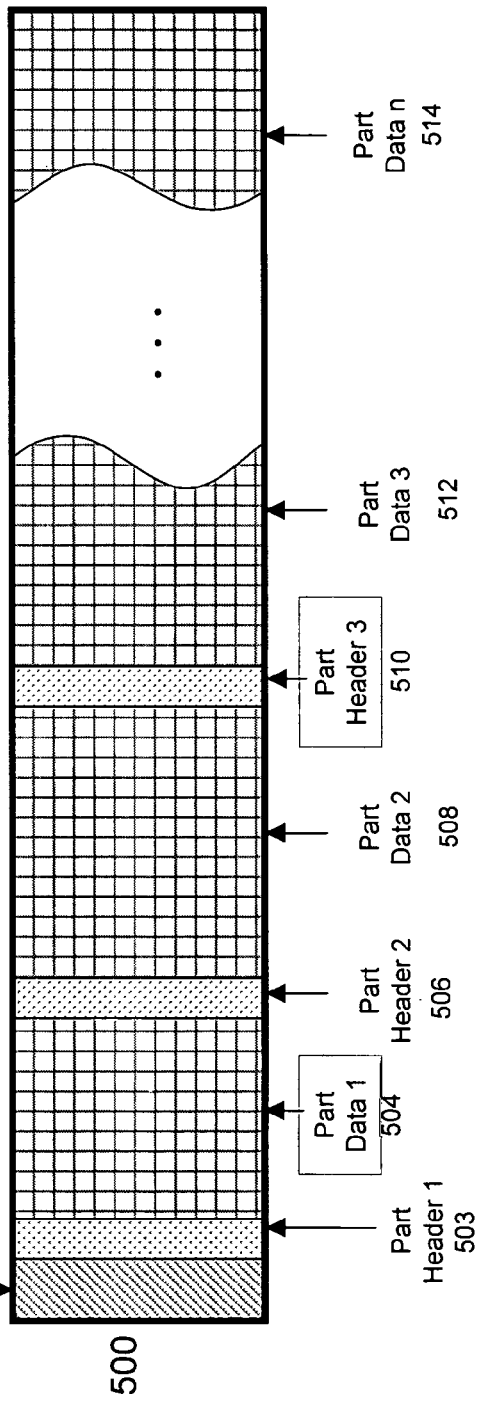
FIG. 5 is a block diagram depicting the format of a typical MIME file format used for transmitting email messages on the Internet and through gateways according to existing Internet email protocols.

FIG. 4 and FIG. 5 show two different file formats of files that may contain more than one section. FIG. 4 is a diagrammatic representation of an exemplary compressed file format known as the ZIP file format invented by Phil Katz in 1986. Phil Katz made a utility program called PKZIP that creates and reads ZIP file formats available in 1989. Many software programs, including PKZIP available from PKWARE, INC. of Brown Deer Wis., can read USA the ZIP format. A description of the file format is available on the Internet at http://www.pkware.com/products/enterprise/white_papers/appnote.txt Referring now to FIG. 4, the entire ZIP file 400 is shown in diagrammatic representation. A ZIP file 400 is comprised of at least one file header 402 that in turn is comprised of information about the file following the header, including a file header signature, the file name, which directory the file was initially stored in, which type of compression has been used on the file, the compressed and uncompressed length of the file, etc. The file header information 402 may be used to read and decompress the file contained in the ZIP file 400. The actual file information or file data 404 is stored in the ZIP file after the file header 402. The optional data descriptor 406 is found after the file data 404 and contains a CRC as well as the file data length and the compressed data length. Additional file headers, data, and descriptors (408, 410, 412) are stored in sequence as shown in FIG. 4. At the end of the ZIP file 400, after the last file data 414 and optional descriptor 416, there may exist a central directory 418 containing information about all of the files stored in the ZIP file 400. In most cases, individual file data 404 can be decompressed using the information in the file header 402 without regard to the descriptor 406 or the central directory 418. The descriptor 406 provides verification that the file data 404 has not become corrupted.

When scanning for viruses, each section of a zip file can be scanned independently or rejected and not scanned at all. For instance, it is impossible to hide a virus in the file header 402 section of the zip file 400 or in the data descriptor section 406. The data descriptor 406, if it exists is only 12 bytes long in most cases.

Referring now to FIG. 5, a MIME (Multipurpose Internet Mail Extensions) file format 500 is shown in diagrammatic form. Internet mail formats were originally designed only to handle individual text files and the MIME standard extended the mail system to be able to handle multiple files with arbitrary content. RFCs are "Request For Comments" documents that describe Internet standards. The relevant RFCs for MIME standards are available in many places on the web, including the web site of the Internet Engineering Task Force at http://www.ietf.org/. The relevant RFCs for MIME are RFC 2045 thought RFC 2049. Those skilled in the art are familiar with these standards and almost all modern mail systems use the MIME standards for adding attachments to email messages.

A MIME message or file 500 includes a set of headers 502 that at a minimum describe the origin and destination of the mail message. The headers 502 comprise additional information, including the path that the MIME message took through the mail system, a subject line, etc. After the headers 502, if there are additional parts to the MIME message, there is a part header 503 that is followed by the part data 504. Additional pairs of part headers 506, 510 and part data 508, 512, 514 may follow the initial part data 504. Each of these headers 503, 506, 510 and data 504, 508, 512, 514 are different sections. Part data 504, 508, 512, 514 may be any length in MIME files up to the limits of the transmission system. Also, although atypical, part data 504, 508, 512, 514 may be zero length. In other words, a section of a file 500 to be processed by a virus scanner may be somewhere between 0 and n bytes where n is arbitrarily large.

Figure 6:
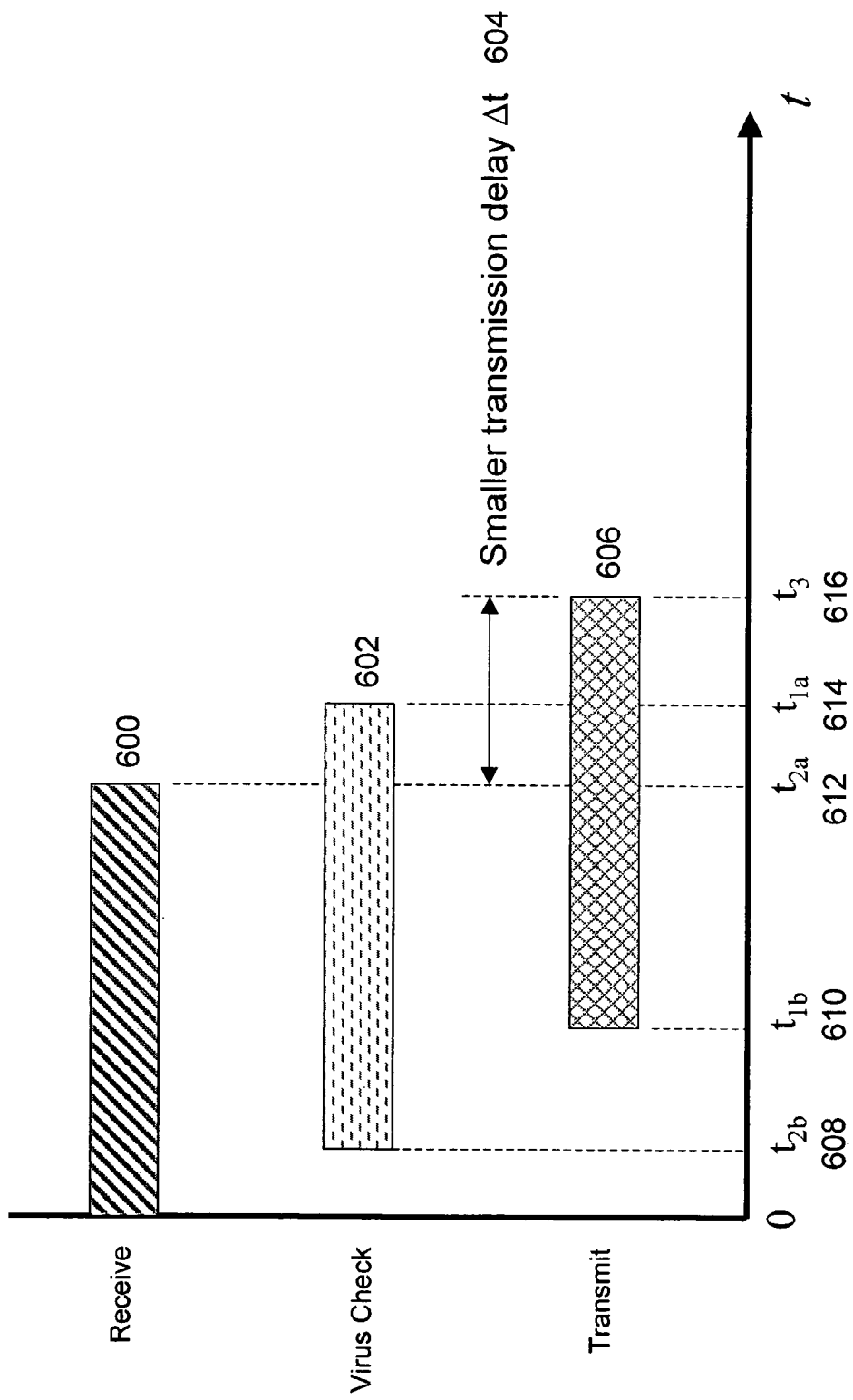
FIG. 6 is a timing diagram showing a reduced delay or latency for checking network transmissions for viruses at a gateway, according to one embodiment of the present invention.

Referring now to FIG. 6, a timing diagram is shown which indicates that the latency in a gateway may be reduced, and thereby improved, by allowing individual sections of a file to be scanned without waiting to receive an entire file. In FIG. 5, all of the packets making up the entire file had to be received 100 before virus scanning could begin at $t_2$ 306. In contrast as shown in FIG. 6, using the techniques of the present invention, as soon as a section has been received at $t_{2b}$ 608, the virus scanning 602 for that section can begin. Moreover, as soon as the sections have been scanned and are available, they are output. The total transmission delay $\Delta t$ 604 depends only on the size of the last section of the file received at $t_{2a}$ and the amount of time required to scan that final section for viruses 602 and then transmit that final section 606. By the time the final section has been received, it is possible that all of the other sections have been checked and transmitted to the computer inside the LAN.

Figure 7:
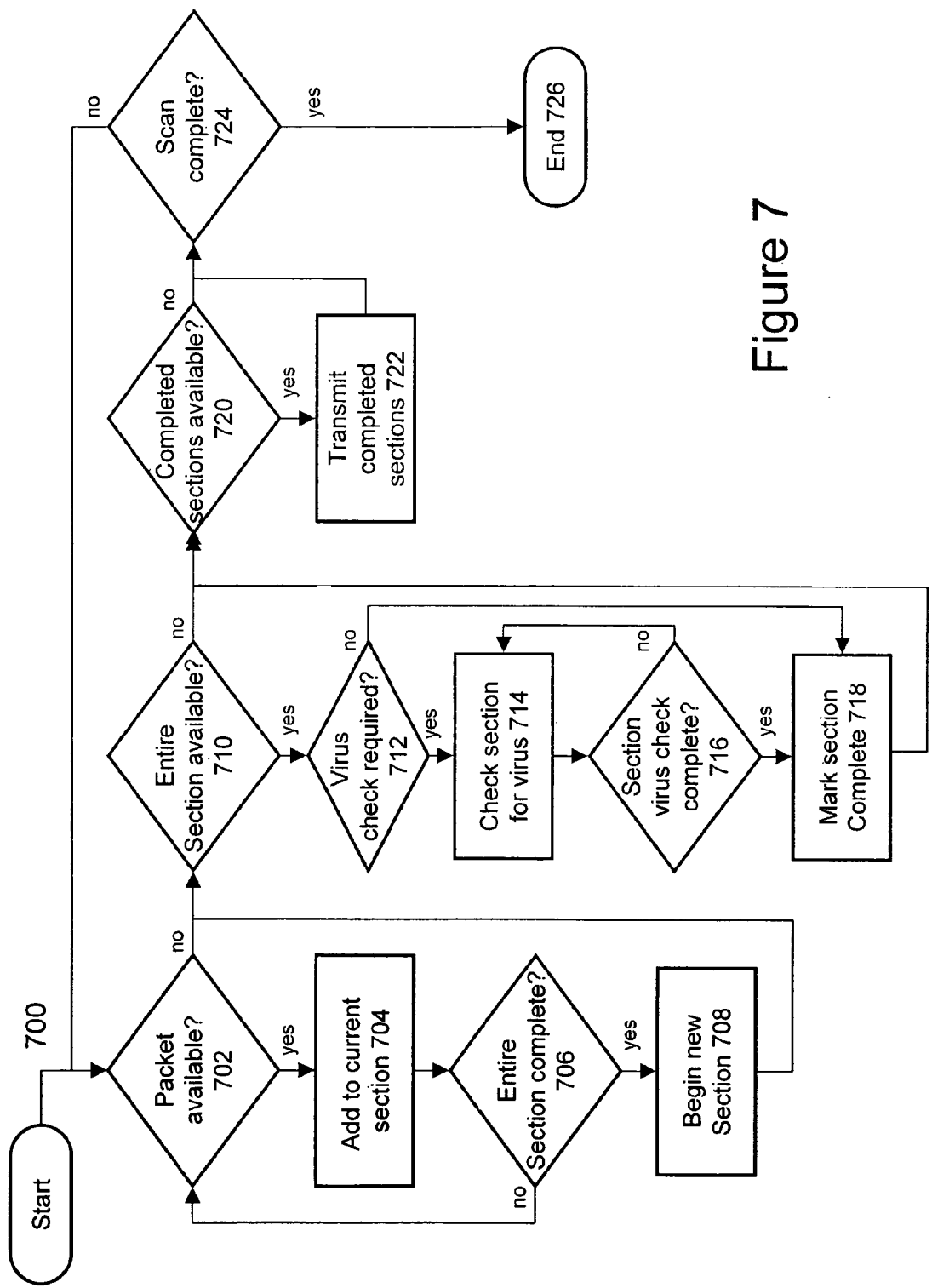
FIG. 7 is a flow diagram showing process for virus checking on the gateway, according to one embodiment of the present invention.

FIG. 7 shows a flow diagram of the system of the present invention and indicates how transmission delay can be reduced while checking for viruses. At step 700, the process begins. At step 702, if a packet is available for transmission, it is received and added to the current section at step 704 and the packet is uncompressed or decoded if necessary. If, at step 704, a current section has not been defined, one is created. Sections can be any length from 0 bytes to an arbitrary number of bytes. In step 706, the method tests if the section is complete. If not, the method returns to step 702. If, after step 706, the section is now complete and can be checked for viruses, then at step 708 a new section is begun and the completed section is marked or enqueued as being ready for virus scanning. If not, step 708 is skipped. At step 710, if an entire section is available on a queue or a section has been marked as complete, control is passed to step 712 where a determination is made whether or not this section must be checked for a virus. In the example of the ZIP format file, headers cannot contain viruses, nor can compressed JPG files embedded in zip files, etc. If at 712 it is determined that this section cannot contain a virus, blocks steps 714, 716, and 718 are skipped and the section is marked as free of viruses. At block 720, the process tests if there exists a section that has been marked free of viruses, and at least a portion of it is transmitted at step 722. It should be noted that it is a particularly advantageous feature of the present invention that scanned sections are output as soon as possible. By doing so, scanned packets can be sent at the same time other packets are being scanned, and thereby minimizing the latency to the time required to scan the last section. If there are no virus-free, complete sections available, no packets are transmitted at step 722. If all sections have been transmitted at step 724, the process is complete 726. If there are still packets being received, or sections that need scanned or packets that must be transmitted, flow returns to step 702.

At step 712, if it is determined that a section must be checked for viruses, control is passed to step 714 where at least part of the section is checked for viruses. At this step, the present invention may either remove the virus from the section, completely deleted the section or take another action such as notifying the system administrator according to a default set by the user. If the virus check is completed at step 714, then at 716 the method tests whether virus scanning for this section is complete. If so the process continues in step 718 and that section is marked as being free of viruses. If not complete, the virus check on that section is continued when flow returns to 714.

This flow chart shows receiving packets, creating sections, decoding and encoding sections, doing a virus check on sections, and transmitting packets simultaneously. Many computers can process information in a seemingly parallel fashion by switching between tasks rapidly and saving the state of each task before moving to the next task. The flow diagram in FIG. 7 shows such a method of parallel processing, but as anyone skilled in the art would know, there are many ways of achieving parallel operation, including having parallel processors or computers working on different parts of the problem. It will be clear to those skilled in the art that FIG. 7 represents one embodiment of the virus checking process of the present invention and that many other embodiments are possible which are in keeping with the spirit of the present invention.

The above description is included to illustrate the operation of the preferred embodiments and is not meant to limit the scope of the invention. The scope of the invention is to be limited by only the following claims. From the above discussion, many variations will be apparent to one skilled in the relevant art that would yet to be encompassed by the spirit and scope of the invention.

The invention claimed is:

1. A method for performing virus detection on a file having a plurality of sections, the method comprising: using a computer processor to perform method steps, the steps comprising: receiving a first section of the file; determining whether the entire first section is available and whether the first section requires virus scanning; responsive to the determination the first section of the file does not require scanning, transmitting the first section of the file; responsive to the determination the first section requires scanning, scanning the first section of the received file for viruses and producing virus free first scanned data after enough of the first section of the file has been received to perform scanning, wherein producing virus free first scanned data comprises rewriting the first section of the received file and re-encoding the first section of the received file in a correct packet format; receiving a second section of the file; determining whether the entire second section is available and whether the second section requires virus scanning; while scanning the first section of the received file for viruses, simultaneously scanning the second section of the received file for viruses and producing virus free second scanned data, wherein producing virus free second scanned data comprises rewriting the second section of the received file and re-encoding the second section of the received file in a correct packet format; transmitting the virus free first scanned data; and transmitting the virus free second scanned data.

2. The method of claim 1 wherein the scanning step begins before the step of receiving the first section of the file is complete.

3. The method of claim 1 wherein the scanning step begins prior to receiving the second section of the file.

4. The method of claim 1 wherein the step of scanning the first section of the received file is completed before the entire file has been received.

5. The method of claim 1 wherein the step of transmitting the virus free first scanned data begins before the step of receiving the second section of the file is complete.

6. The method of claim 1 wherein the step of transmitting the virus free first scanned data is complete before the entire file has been received.

7. The method of claim 1 wherein the transmitting step begins after enough of the file has been scanned to perform transmitting.

8. The method of claim 1 wherein the file is a compressed file including other files.

9. The method of claim 8 wherein the compressed file has a ZIP format.

10. The method of claim 1 further comprising the steps of: decompressing the first section of the file prior to scanning, and compressing the first section of the file after scanning and prior to the transmitting step.

11. The method of claim 1 wherein the file is in a MIME format.

12. The method of claim 1 wherein the step of receiving the first section of the file includes: determining whether a packet of a current section of the file is available; adding the packet to the current section of the file for virus detection; determining whether the section is complete; and beginning a new selection if the section is complete.

13. The method of claim 1 wherein the step of scanning the first section of the received file for viruses includes: determining whether an entire section is available; determining whether the section requires a virus scan; and marking the section complete if the section does not require a virus scan.

14. The method of claim 1 wherein further comprising the step of determining whether a complete section is available, and wherein the step of transmitting the section of the file sends the completed section.

15. A non-transitory computer readable storage medium for performing virus detection on a file having a plurality of sections, the computer readable medium comprising: a mechanism for receiving a first section of the file; a mechanism for determining whether the entire first section is available and a mechanism for determining whether the first section requires scanning; a mechanism for transmitting the first section of the file responsive to the determination the first section of the file does not require scanning; a mechanism for scanning the first section of the received file for viruses responsive to the determination the first section requires scanning and producing virus free first scanned data after enough of the first section of the file has been received to perform scanning, wherein producing virus free first scanned data comprises rewriting the first section of the received file and re-encoding the first section of the received file in a correct packet format; a mechanism for receiving a second section of the file; a mechanism for determining whether the entire second section is available and a mechanism for determining whether the second section requires scanning; a mechanism for simultaneously scanning the second section of the received file for viruses and producing virus free second scanned data while scanning the first section of the received file for viruses, wherein producing virus free second scanned data comprises rewriting the second section of the received file and re-encoding the second section of the received file in a correct packet format; a mechanism for transmitting the virus free first scanned data; and a mechanism for transmitting the virus free second scanned data.

16. The computer readable medium of claim 15 wherein the mechanism for transmitting begins after enough of the file has been scanned to perform transmitting.

17. The computer readable medium of claim 15 further comprising: a device for decompressing the first section of the file prior to scanning; and a device for compressing the first scanned data prior to transmitting.

18. The computer readable medium of claim 15 wherein the mechanism for scanning includes one from a group of: a means for deleting a virus in a section from scanned data of the file; and a means for removing the virus from the section of the file.

19. A method for performing virus detection on a file, the file including a plurality of other files, the method comprising: using a computer processor to perform method steps, the steps comprising: receiving a first file of the file; determining whether the first file requires virus scanning; responsive to the determination the first file does not require scanning, transmitting the first file; responsive to the determination the first file requires scanning, scanning the first file of the file for viruses and producing virus free first scanned data after enough of the first file of the file has been received to perform scanning, wherein producing virus free first scanned data comprises rewriting removing virus being detected in the first file and re-encoding the first file in a correct packet format; receiving a second file of the file; determining whether the second file requires virus scanning; while scanning the first file of the file for viruses, simultaneously scanning the second file of the file for viruses and producing virus free second scanned data, wherein producing virus free second scanned data comprises rewriting removing virus being detected in the second file and re-encoding the second file in a correct packet format; transmitting the virus free first scanned data; transmitting the virus free second scanned data.

20. The method of claim 19 wherein the file is a compressed file.

21. The method of claim 19 wherein the file is a ZIP file.

22. A non-transitory computer-readable storage medium storing a computer program for performing virus detection on a file, the file including a plurality of other files, the computer program comprising program code for: receiving a first file of the file; determining whether the first file requires virus scanning; responsive to the determination the first file does not require scanning, transmitting the first file; responsive to the determination the first file requires scanning, scanning the first file of the file for viruses and producing virus free first scanned data after enough of the first file of the file has been received to perform scanning, wherein producing virus free first scanned data comprises rewriting the first file removing virus being detected in the first section of the received file and re-encoding the first file in a correct packet format; receiving a second file of the file; determining whether the second file requires virus scanning; while scanning the first file of the file for viruses, simultaneously scanning the second file of the file for viruses and producing virus free second scanned data, wherein producing virus free first scanned data comprises rewriting the second file and re-encoding the second file in a correct packet format; transmitting the virus free first scanned data; and transmitting the virus free second scanned data.

23. The computer-readable storage medium of claim 22 wherein the file is a compressed file.

24. The computer-readable storage medium of claim 22 wherein the file is a ZIP file.

* * * * *